Feb. 21, 1961 C. E. BRANICK 2,972,405
TIRE BEAD SPACING AND SUPPORTING ELEMENT
Filed June 3, 1960 2 Sheets-Sheet 1

INVENTOR.
CHARLES E. BRANICK
BY
Merchant & Merchant
ATTORNEYS

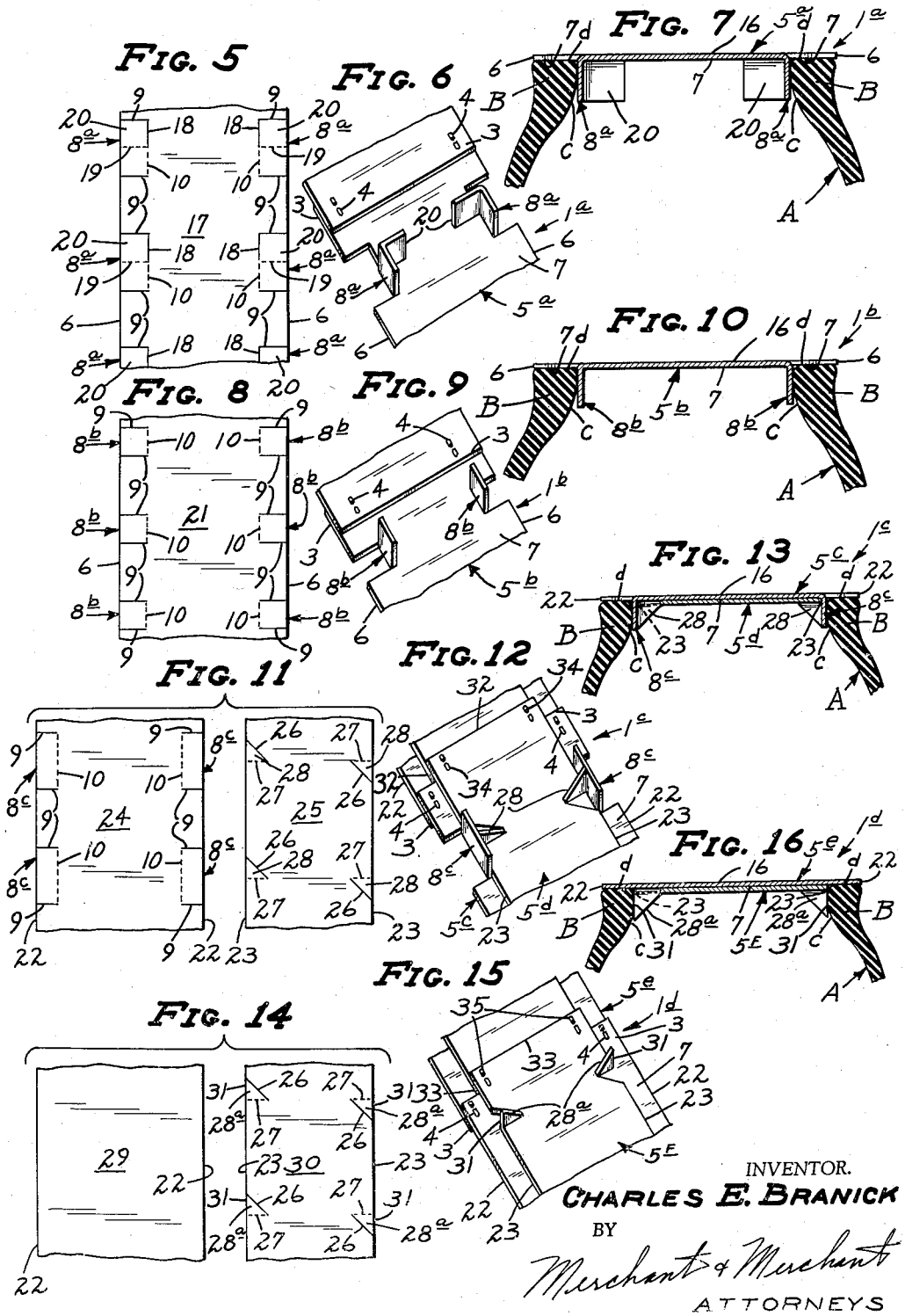

United States Patent Office
2,972,405
Patented Feb. 21, 1961

1

2,972,405

TIRE BEAD SPACING AND SUPPORTING ELEMENT

Charles E. Branick, % Branick Mfg. Co., P.O. Box 1937, Fargo, N. Dak.

Filed June 3, 1960, Ser. No. 33,819

3 Claims. (Cl. 206—46)

This invention relates generally to pneumatic tire handling and merchandising apparatus, and more particularly it relates to a tire bead spacing and supporting element.

A perplexing problem characteristic of the handling, storage, shipping and display of tires has been the need for economical and efficient means for preventing tire casings from collapsing when the same are piled one on the other. Somewhat of a corollary to the above problem has been the problem of devising means for providing a base upon which pressure may be applied during the application of wrappers about pneumatic tires previous to the shipping thereof.

In answer to the above problems, an important object of the applicant's invention is the provision of a tire bead spacing and supporting element which is adapted to engage the axially inner surfaces of the tire beads so as to maintain the beads axially spaced from one another a distance approximating the distance therebetween when the tire is mounted for use on a wheel.

Another important object of this invention is the provision of a tire bead spacing and supporting element which defines a substantially smooth axially extending inner surface which is generally contiguous with the inner circumferential bead surfaces of a tire within which it is placed whereby to provide a base upon which pressure may be applied during the application of a wrapper about the tire.

Another object of this invention is the provision of a tire bead spacing and supporting element which may be easily installed in its tire bead spacing and supporting position.

Other objects of this invention reside in the provision of a tire bead spacing and supporting element which is economical to produce, strong and durable enough to give optimum satisfaction in its intended use and highly efficient in the vindication of its purposes.

The above and still further objects of this invention will become apparent from the following detailed specification, appended claims and attached drawings.

Referring to the drawings wherein like reference characters indicate like parts or elements throughout the several views:

Fig. 5 is a view similar to Fig. 2, but showing an alternative embodiment of my invention;

Fig. 6 is a view similar to Fig. 3, but showing the embodiment of my invention disclosed in Fig. 5;

Fig. 7 is a view similar to Fig. 4, but showing the embodiment of my invention disclosed in Figs. 5 and 6;

Fig. 8 is a view similar to Figs. 2 and 5, but showing another embodiment of my invention;

Fig. 9 is a view similar to Figs. 3 and 6, but showing the embodiment of my invention disclosed in Fig. 8;

Fig. 10 is a view similar to Figs. 4 and 7, but showing the embodiment of my invention disclosed in Figs. 8 and 9;

Fig. 11 is a plan view of the blanks from which another embodiment of my invention is formed, cut portions thereof being shown in full lines and scored portions thereof being shown in dotted lines;

Fig. 12 is a view similar to Figs. 3, 6 and 9, but showing the embodiment of my invention disclosed in Fig. 11;

Fig. 13 is a view corresponding to Figs. 4, 7 and 10, but showing the embodiment of my invention disclosed in Figs. 11 and 12;

Fig. 14 is a view similar to Fig. 11, but showing still another embodiment of my invention;

Fig. 15 is a view corresponding to Figs. 3, 6, 9 and 12, but showing the embodiment of my invention disclosed in Fig. 14; and Fig. 16 is a view corresponding to Figs. 4, 7, 10 and 13, but showing the embodiment of my invention disclosed in Figs. 14 and 15.

Referring with greater particularity to the drawings, the reference letter A represents a pneumatic tire in its entirety, and the reference letter B represents the beads thereof, the axial inner surfaces of which are represented by the reference letter c and the circumferential surfaces of which are represented by the reference letter d.

Figure 1:
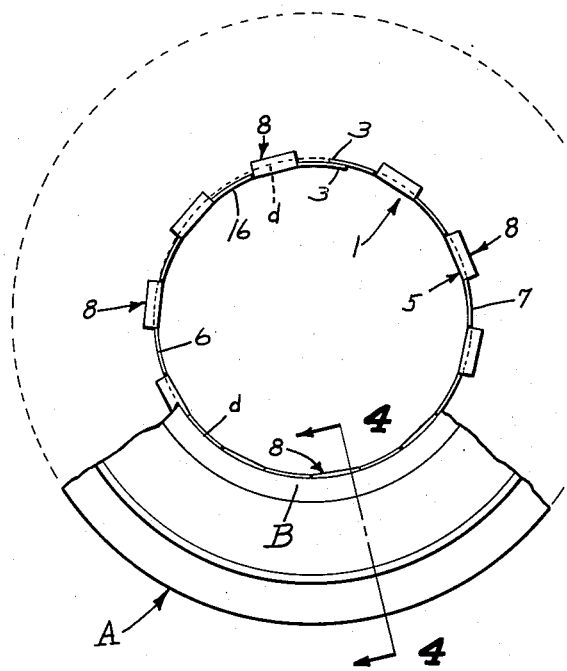
Fig. 1 is a view in side elevation of my invention as installed on a tire, some parts of the tire being broken away.
Figure 2:
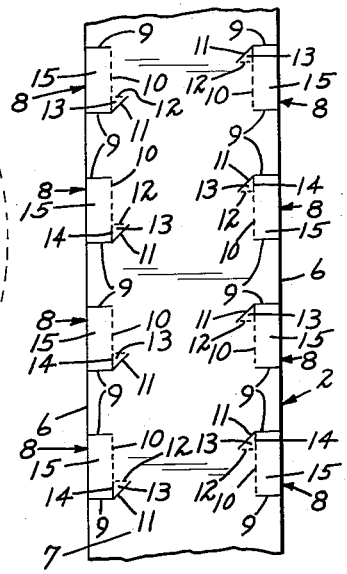
Fig. 2 is a plan view of a portion of a blank forming this invention, cut portions thereof being shown by full lines and scored portions thereof being shown by dotted lines.
Figure 4:
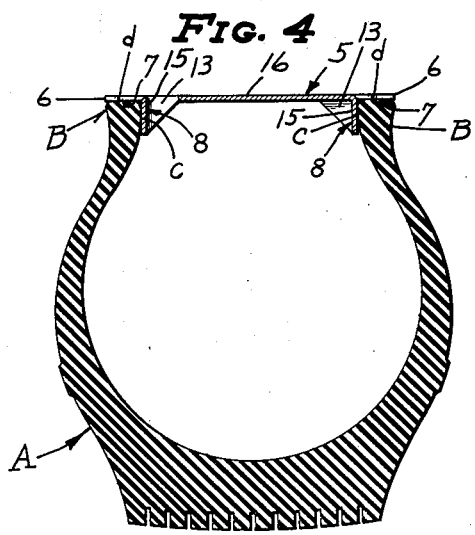
Fig. 4 is a view in section taken on the line 4—4 of Fig. 1 and showing the blank disclosed in Figs. 2 and 3 in its operative position.

My invention comprises the tire bead spacing and supporting element, represented in its entirety by the numeral 1, and formed from the integral blank 2 of sheet material, a portion of which is shown in Fig. 2. The blank 2 is preferably formed from a relatively rigid material such as cardboard, corrugated paper, sheet metal, plastic, or any other suitable material. The opposite ends 3 of the blank 2 are secured together, as by the staples 4, so as to form a relatively rigid generally cylindrical annular sleeve, represented in general by the reference numeral 5. The sleeve 5 defines axially spaced generally parallel marginal edges 6. The outer cylindrical surface 7 of the sleeve 5 is adapted to engage the inner circumferential surface portion d of the tire beads B. In accordance with my invention, the axial width of the sleeve 5 is greater than the normal distance between the tire beads B when the tire A is mounted for use on a wheel, not shown.

Figure 3:
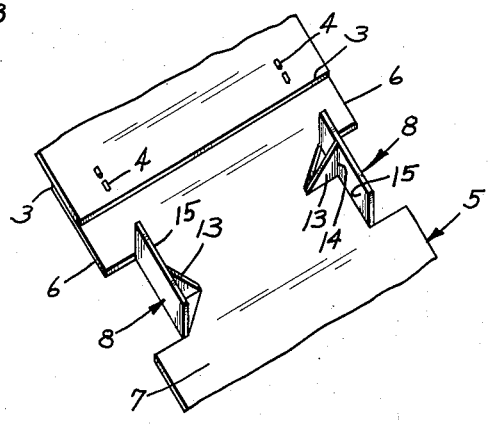
Fig. 3 is a view in perspective of a portion of the blank shown in Fig. 2 in its assembled position.

As seen particularly in Fig. 3, a plurality of circumferentially spaced radially outwardly projecting lugs, represented in general by the reference numeral 8, are disposed on the sleeve 5 axially inwardly spaced from both marginal edges 6 thereof. By referring to Fig. 2, it will be noted that the lugs 8 are formed by the plurality of circumferentially spaced axially outwardly extending slits 9 cut on both marginal edges 6 of the sleeve 5. Then, alternate portions between the slits 9 are bent in a radially outward direction along the score lines 10 so as to define the lugs 8. It will be noted that the blank 2 is further cut and scored, as at 11 and 12 respectively, so as to define the bracing tabs 13, which are bent in a radially outward direction along the score line 12 so that the axial outward edges 14 thereof abut against the axial inner surfaces 15 of the lugs 8. After insertion of the tire bead spacing and supporting element 1 within the tire A, the lugs 8 are adaptable to engage the axially inner surfaces c of the beads B so as to maintain the beads B axially spaced from one another a distance approximately the distance therebetween when the tire A is mounted for use on a wheel, not shown, the foregoing being shown in Fig. 4. After inserting my tire bead spacing and supporting element within a plurality of tire casings, the same may be stacked one on top of the other without causing the tires to collapse.

A corollary to the above-described function of the bead spacing and supporting element 1 is its function in providing support during the application of a wrapper, not shown, about the tire. It will be noted in this regard that the sleeves 5 defines a substantially smooth axially extending generally cylindrical inner surface 16 which is generally contiguous with the inner circumferential bead surfaces d of the tire A whereby to provide a base upon which pressure may be applied when applying a wrapper, not shown, about the tire A.

Figs. 5, 6, and 7 illustrate another embodiment of my invention in which the lugs 8a are constructed in an alternative manner, the blank from which the sleeve 5a of this modification is constructed being represented generally by the reference numeral 17. In this modification of my invention, the blank 17 is cut, as at 18, along a line generally parallel with both marginal edges 6 thereof, and the lugs 8a are longitudinally intermediately scored, as at 19, so as to define axially inwardly turning brace portions 20. It should be noted that this modification of my invention corresponds in all respects not specifically above enumerated to the embodiment of my invention shown in Figs. 1–4, similar parts or elements in both instances being represented by the same reference characters.

Figs. 8, 9 and 10 show another modification of my invention in which the only difference from the previous embodiments thereof is that the blank 21 is cut as at 9, and scored, as at 10, so as to define lugs 8b which are provided with any type of bracing elements as in the previously described embodiments of my invention. In this modification, the lugs 8b of the sleeve 5b rely for their bracing action upon the rigidity of the material from which the blank 21 is manufactured. It should again be noted that this modification corresponds in all respects not specifically enumerated to the previously described embodiments of my invention, and corresponding parts or elements in both cases are represented by the same reference characters in Figs. 1–10.

Figs. 11, 12 and 13 illustrate still another modification of my invention in which the tire bead spacing and supporting element 1 comprises an inner sleeve 5c and an outer sleeve 5d, both of which define axially spaced generally parallel marginal edges 22 and 23 respectively. The inner sleeve 5c and the outer sleeve 5d are formed from the blanks 24, 25 respectively, of sheet material which are shown in Fig. 11, the ends 32 of the outer sleeve 5d being secured together, as by the staples 34. The inner sleeve 5c is adapted to engage the inner circumferential surface portion d of the tire bead B, the axial width of the inner sleeve 5c being greater than the normal distance between the beads B when the tire A is mounted for use on a wheel, not shown. The blank 24 from which the inner sleeve 5c is formed is cut, as at 9, and scored, as at 10, so as to define the radially outwardly extending lugs 8c. The outer sleeve 5d is adapted to be received about and engage the outer cylindrical surface 7 of the inner sleeve 5c in generally transversely centrally spaced relationship thereto, and is of an axial width less than the axial width of the inner sleeve 5c, which width approximates the distance between the tire beads B when the tire A is mounted for use on a wheel, not shown. The marginal edges 23 of the outer sleeve 5d are obliquely cut, as at 26, and scored, as at 27, so as to define the radially outwardly extending bracing tabs 28. The bracing tabs 28 defined by the outer sleeve 5d are adapted to abut against the lugs 8c defined by the inner sleeve 5c when the tire bead spacing and supporting element 1c is placed in its operative position as shown in Fig. 13. It should again be noted that this modification of my invention corresponds in all respects not specifically above enumerated to the previously described embodiments of my invention, and similar parts or elements in both instances are again represented by the same reference characters.

Figs. 14, 15 and 16 illustrate another modification of my invention similar to the modification disclosed in Figs. 11–13. However, in this modification the inner sleeve 5e is formed from a plain, unscored and uncut blank 29, and is combined with an outer sleeve 5f formed from the blank 30 and which is identical to the outer sleeve 5d disclosed in the modification shown in Figs. 11–13, the ends 33 of the outer sleeve 5f being secured together by the staples 35. In this modification however, the bracing tabs 28a defined by the outer sleeve 5d serve also in the capacity of the lugs 8c employed in the previous modifications, the axially outer edges 31 of the tabs 28a abutting directly against the axial inner surface c of the beads B. Again, this modification of my invention corresponds in all respects not specifically enumerated to the previously described embodiments of my invention, and similar parts or elements in both instances are represented by the same reference characters.

It should be noted that the illustrated modifications of my invention are given for the purposes of illustration only, the scope of my invention being limited by the appended claims. This invention has been thoroughly tested and found to be completely satisfied for the accomplishment of the above objects; and while I have shown a preferred embodiment thereof, I wish it to be specifically understood that the same may be modified without departure from the scope and spirit of the appended claims.

What I claim is:

1. A tire bead spacing and supporting element comprising a relatively rigid annular sleeve formed from sheet material and having axially spaced generally parallel edges, said sleeve being adapted to engage the inner circumferential surface portion of the tire beads and the axial width of said sleeve being greater than the normal distance between said tire beads, and a plurality of circumferentially spaced radially outwardly projecting lugs on said sleeve axially inwardly spaced from both marginal edges thereof and adapted to engage the axially inner surfaces of said beads so as to maintain said beads axially spaced from one another a distance approximating the distance therebetween when the tire is mounted for use on a wheel, said spacing and supporting element further defining a substantially smooth axially extending inner surface which is generally contiguous with the inner circumferential bead surfaces of the tire whereby to provide a base upon which pressure may be applied during the application of a wrapper about the tire.

2. A tire bead spacing and supporting element comprising a relatively rigid generally cylindrical annular sleeve formed from sheet material and having axially spaced generally parallel edges, said sleeve being adapted to engage the inner circumferential surface portion of the tire beads and the axial width of said annular sleeve being greater than the normal distance between said tire beads, said sleeve defining a plurality of circumferentially spaced axially outwardly extending slits on both marginal edges thereof, alternate portions between said slits being bent in a radially outwardly extending direction so as to define a plurality of lugs axially inwardly spaced from both marginal edges of said sleeve, said lugs being adapted to engage the axially inner surfaces of the beads so as to maintain said beads axially spaced from one another a distance approximating the distance therebetween when the tire is mounted for use on a wheel, said spacing and supporting element further defining a substantially smooth axially extending generally cylindrical inner surface which is generally contiguous with the inner circumferential bead surfaces of the tire whereby to provide a base upon which pressure may be applied during the application of a wrapper about the tire.

3. A tire bead spacing and supporting element comprising a relatively rigid generally cylindrical annular inner sleeve formed from sheet material and having axially spaced generally parallel edges, said inner sleeve being adapted to engage the inner circumferential surface portion of the tire beads and the axial width of said inner sleeve being greater than the normal distance between said tire beads, a relatively rigid generally cylindrical annular outer sleeve formed from sheet material and having axially spaced generally parallel edges, the axial width of said outer sleeve being less than the axial width of said inner sleeve and approximating the distance between said tire beads when the tire is mounted for use on a wheel, said outer sleeve being adapted to be received about and engage the outer cylindrical surface of said inner sleeve in generally transversely centrally spaced relationship thereto, and a plurality of circumferentially spaced radially outwardly projecting lugs on said outer sleeve axially inwardly spaced from both marginal edges of said inner sleeve and adapted to engage the axially inner surfaces of said beads so as to maintain said beads axially spaced from one another a distance approximating said aforementioned distance, said inner sleeve further defining a substantially smooth axially extending inner surface which is generally contiguous with the inner circumferential bead surfaces of the tire whereby to provide a base upon which pressure may be applied during the application of a wrapper about the tire.

References Cited in the file of this patent

UNITED STATES PATENTS 2,573,664   Herzegh _____ Oct. 30, 1951